United States Patent [19]

Yamaoka et al.

[11] Patent Number: 4,992,960
[45] Date of Patent: Feb. 12, 1991

[54] APPARATUS FOR PROCESSING IMAGE DATA FOR DISPLAYING AN IMAGE ON A DISPLAY UNIT

[75] Inventors: Shigemitsu Yamaoka; Kenji Iwamoto; Kazuyuki Ito, all of Hamamatsu, Japan

[73] Assignee: Yamaha Corporation, Shizuoka, Japan

[21] Appl. No.: 131,212

[22] Filed: Dec. 10, 1987

[30] Foreign Application Priority Data

Dec. 11, 1986 [JP] Japan ................. 61-295229
Dec. 27, 1986 [JP] Japan ................. 61-313401

[51] Int. Cl.⁵ .......................................... G06F 3/153
[52] U.S. Cl. .................................. 364/521; 364/518
[58] Field of Search ..................... 364/518–522; 382/44–48; 358/256, 257, 280; 340/723, 724, 731, 747, 750, 798–800

[56] References Cited

U.S. PATENT DOCUMENTS

4,628,467 12/1986 Nishi et al. ........................... 364/521
4,706,205 11/1987 Akai et al. ............................ 364/518
4,731,742  3/1988 Nishi et al. ...................... 340/703 X
4,737,772  4/1988 Nishi et al. ........................... 340/703
4,745,576  5/1988 Hasegawa et al. ................... 364/900

Primary Examiner—Gary V. Harkcom
Assistant Examiner—H. R. Herndon
Attorney, Agent, or Firm—Scully, Scott, Murphy & Presser

[57] ABSTRACT

An image processing apparatus processes image data stored in a memory to thereby display an image on a display screen of a display unit under a control of a central processing unit (CPU). In one aspect of the invention, source data read from a source area of the memory are subjected to a rotation process and a logical operation and then converted to transfer data which will be written in a destination area of the memory by every word. In addition, first and last words within one line on the display screen are masked in accordance with predetermined first and second mask data. In another aspect of the invention, one of a wait mode and a not-wait mode is selected by wait control data outputted from the CPU. In the wait mode, the CPU is subjected to a wait state even in a memory read cycle. In the not-wait mode, the CPU is not subjected to the wait state normally in the memory read cycle. However, the CPU is subjected to the wait state in the not-wait mode while a reading operation of the memory has not been completed.

11 Claims, 8 Drawing Sheets

Fig.1 (PRIOR ART)

Fig.2 (PROIR ART)

APPARATUS FOR PROCESSING IMAGE DATA FOR DISPLAYING AN IMAGE ON A DISPLAY UNIT

BACKGROUND OF THE INVENTION

1. Field of the Invention

The present invention generally relates to an image processing apparatus, and more particularly to an image processing apparatus which processes image data so as to display a certain image on a screen of a CRT display unit under a control of a central processing unit (CPU), for example.

2. Prior Art

Recently, several kinds of image processing apparatuses are developed and quite effective for displaying an image corresponding to image data stored in a video random memory (VRAM) on the screen of the CRT display unit under the control of the CPU.

Figure 1:
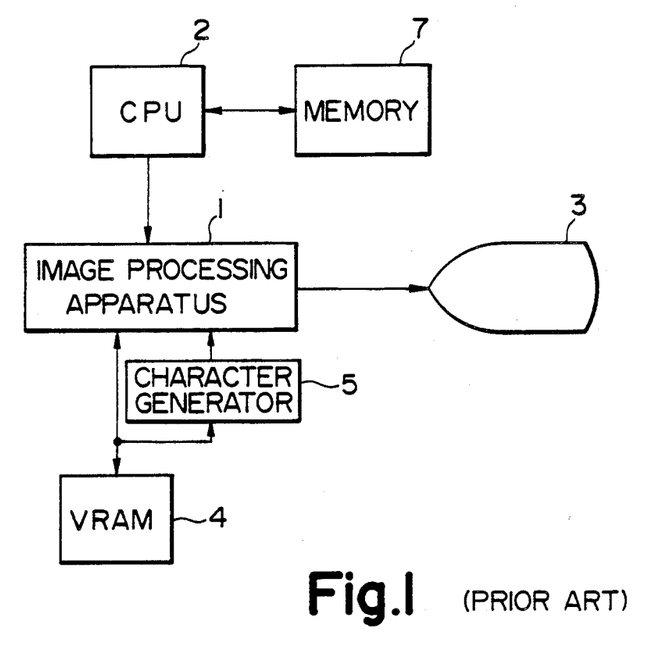
FIG. 1 is a block diagram showing a general image display system employing a conventional image processing apparatus.

FIG. 1 is a block diagram showing a general image display system employing a conventional image processing apparatus. In FIG. 1, an image processing apparatus 1 performs an image display on a screen of a CRT display unit 3 under a control of a CPU 2. In addition, a VRAM 4 stores dot data for the image display and character codes, and a character generator 5 used for a character display stores character patterns. The character pattern designated by the character code stored in the VRAM 4 is read from the character generator 5. Furthermore, a memory 7 employs a read only memory (ROM) for storing programs used in the CPU 2.

In some cases, the image processing apparatus 1 is required to perform a block transfer such that a certain part of the image data stored in a certain area of the VRAM 4 is transferred to another area of the VRAM 4. For example, the above cases include a case where a image displayed at a certain position on a display screen of the CRT display unit 3 must be moved to another position, a case where the image data stored in a non-display area of the VRAM 4 must be transferred to a display area of the VRAM 4 so as to display the image thereof on the display screen of the CRT display unit 3, and a case where the image data stored in the display area must be transferred to the non-display area.

Figure 2:
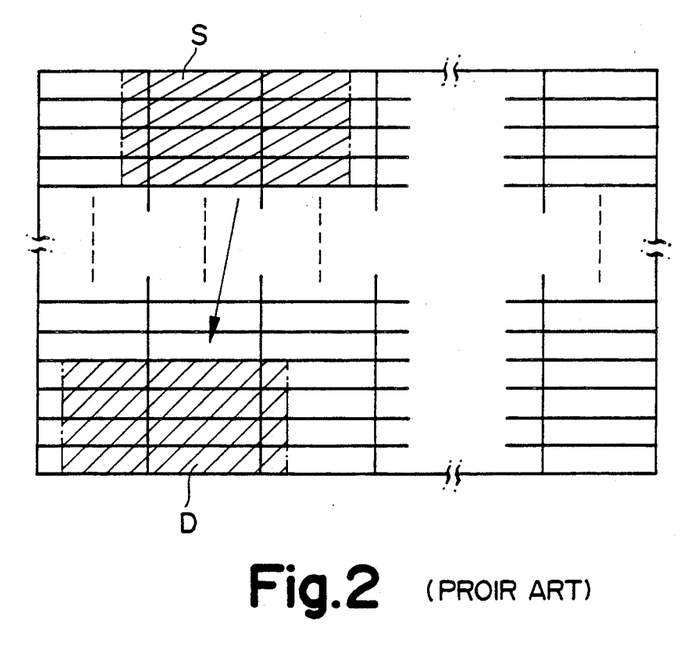
FIG. 2 shows an example of a memory map of the VRAM in the conventional image display system shown in FIG. 1.

In some cases, one of or both of boundaries of a source area and a destination area do not align with a word boundary in the above-mentioned block transfer FIG. 2 shows a memory map of the VRAM 4 representing a case where the boundaries of both of the source and destination areas do not align with the word boundaries, for example. In FIG. 2, each of block sections divided by full lines represents a one word area, a hatched portion S designates the source area, and another hatched portion D designates the destination area. As shown in FIG. 2, the boundaries (shown by dashed lines) of both of the source area S and the destination area D do not align with the word boundaries, and such boundaries are located at middle positions of words.

As described heretofore, the conventional image display system suffers a problem in that a process for a data transfer becomes quite complicated when one of or both of the boundaries of the source and destination areas do not align with the word boundaries. The reason why such process becomes complicated is that each of memories constituting the VRAM 4 can not perform a data access by a one word unit and it is therefore necessary to transfer a bit boundary in the word where each of the boundaries of the source and destination areas is located. More specifically, the conventional system must need a mask process for read data and write data and other processes, hence, the conventional system suffers a problem in that processes of the CPU 2 must be quite complicated. Such problem must be caused in both of a character mode and a graphic mode similarly.

Therefore, the conventional image processing apparatus is disadvantageous in that loads for programs must be increased so that a transfer speed thereof must be delayed when a transfer of bit boundaries is performed.

In order to obtain several effects of an image process, the image processing apparatus performs a logical operation between source data and destination data or among the source and destination data and other prestored data, and data representative of the operation result are written in the destination area. However, there are no conventional apparatus which can perform both of the transfer of bit boundaries and the logical operation at one time, and such apparatus is demanded to be developed in these days.

Figure 3:
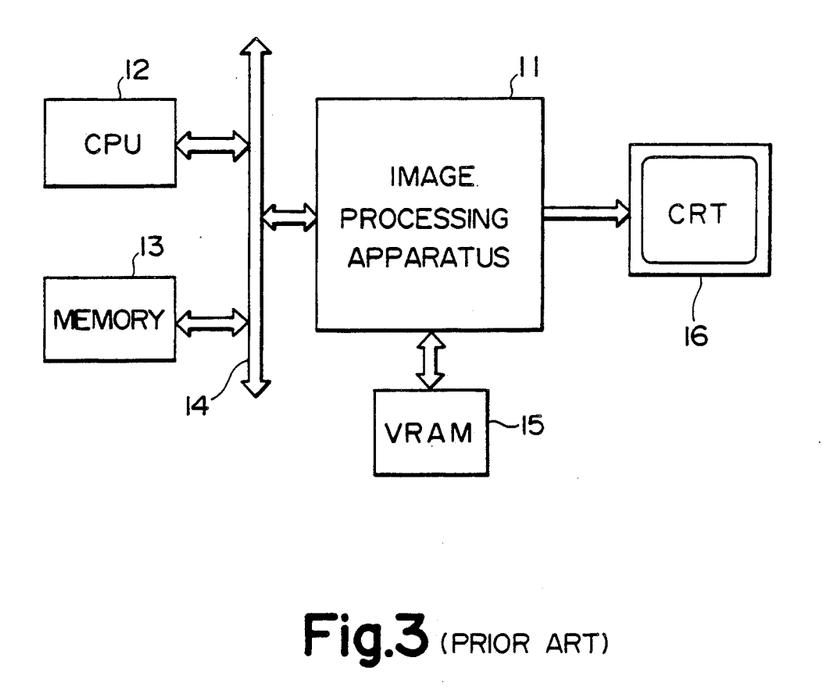
FIG. 3 is a block diagram showing another image display system employing another conventional image processing apparatus.

FIG. 3 is a block diagram showing another image display system employing another conventional image processing apparatus (or a conventional display control apparatus) 11. In FIG. 3, 12 designates a CPU, 13 designates a memory consisting of a ROM for storing programs used for the CPU 12 and a RAM for storing data, 14 designates a bus line, 15 designates a VRAM, and 16 designates a CRT display unit. In this case, the image processing apparatus 11 writes display data (or the image data) outputted from the CPU 12 in the VRAM 15. The image processing apparatus 11 sequentially reads such display data from the VRAM 15 by a timing of a predetermined dot clock so as to convert the read display data into three color signals representative of three primary colors R (red), G (green) and B (blue). Such color signals with a synchronizing signal are outputted to the CRT display unit 16 wherein an image corresponding to the display data stored in the VRAM 15 is displayed on a display screen thereof.

In the case where the CPU 12 reads the display data from the VRAM 15 in the above-mentioned image display system, the CPU 12 outputs addresses and a memory read signal for the VRAM 15 to the image processing apparatus 11 via the bus line 14. Hence, the image processing apparatus 11 outputs a wait signal to the CPU 12 at first. Due to the wait signal, processes of the CPU 12 are subjected to a standby state. Next, the image processing apparatus 11 waits for a timing which enables a memory access and such apparatus 11 thereafter starts to read the display data from the VRAM 15. Thereafter, the image processing apparatus 11 turns off the wait signal so that the data read from the VRAM 15 are outputted to the bus line 14. The CPU 12 reads such data at an end timing of a memory read cycle.

As described above, in the case where the CPU 12 reads the data from the VRAM 15, the conventional image processing apparatus 11 must output the wait signal to the CPU 12 at each time when the CPU 12 outputs the addresses and the memory read signal thereto, and the apparatus must turn off the wait signal when the display data are read from the VRAM 15.

Meanwhile, there exists a case where the CPU 12 does not need the data read from the VRAM 15. For example, in the case where data stored in a first area of the VRAM 15 are transferred to a second area of the VRAM 15, the CPU 12 does not read the data which are read from the VRAM 15 based on the addresses and the memory read signal outputted from the CPU 12. Instead, such data are once stored in the image processing apparatus 11 and then written in the second area of the VRAM 15 in many cases. (However, such process differs depending on a construction of the image processing apparatus 11.)

However, the conventional image processing apparatus 11 must output the wait signal to thereby stop the process of the CPU 12 even in the above-mentioned case. Therefore, the conventional system suffers a problem in that a usage efficiency of the CPU 12 must be lowered.

SUMMARY OF THE INVENTION

It is therefore a primary object of the present invention to provide an image processing apparatus which can perform the block transfer with a high speed and without increasing the loads of the CPU even when the word boundaries of the VRAM do not align with the boundary of the source area or the destination area.

It is another object of the present invention to provide an image processing apparatus which can perform several kinds of logical operations on the data transferred thereto.

It is still another object of the present invention to provide an image processing apparatus which can prevent the usage efficiency of the CPU from being deteriorated by the wait signal.

In a first aspect of the invention, there is provided an image processing apparatus comprising: (a) transfer data generating means for reading source data from one word area or an area of continuing two words provided within a source area so as to generate transfer data of one word having bits which are required for a certain word area within a destination area, the transfer data being obtained by shifting bits of the source data such that bit positions of shifted source data correspond to those of destination area and by extracting predetermined continuing bits of one word from the shifted source data; (b) first and second memory means which are written by first and second mask data respectively, each of the first and second mask data permitting a data transfer to be performed on or inhibiting the data transfer from being performed on every bit of first and last words within one line of the destination area; and (c) mask means for masking the first and last words within one line based on the first and second mask data stored in the first and second memory means when the transfer data are written in the destination area.

In a second aspect of the invention, there is provided an image processing apparatus comprising: (a) transfer data generating means for reading source data from one word area or an area of continuing two words provided within a source area so as to generate transfer data of one word having bits which are required for a certain word area within a destination area, the transfer data being obtained by shifting bits of the source data such that bit positions of shifted source data correspond to those of destination area and by extracting predetermined continuing bits of one word from the shifted source data; (b) logical operation means for performing a predetermined logical operation by using the transfer data, corresponding destination data of one word stored in the destination area and predetermined pattern data; (c) first and second memory means which are written by first and second mask data, each of the first and second mask data permitting a data transfer to be performed on or inhibiting the data transfer from being performed on every bit of first and last words within one line of the destination area; and (d) mask means for masking the first and last words within one line based on the first and second mask data stored in the first and second memory means when output data of the logical operation means are written in the destination area.

In a third aspect of the invention, there is provided an image processing apparatus comprising: (a) register means for storing wait control data outputted from the central processing unit, the wait control data selecting one of a wait mode and a not-wait mode; and (b) means for determining whether a wait signal is outputted therefrom to the central processing unit or not based on the wait control data stored in the register means when the central processing unit outputs a command for performing a reading operation on the memory, the central processing unit being subjected to a wait state when the wait signal is supplied thereto.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings.

DESCRIPTION OF THE PREFERRED EMBODIMENTS

Figure 8:
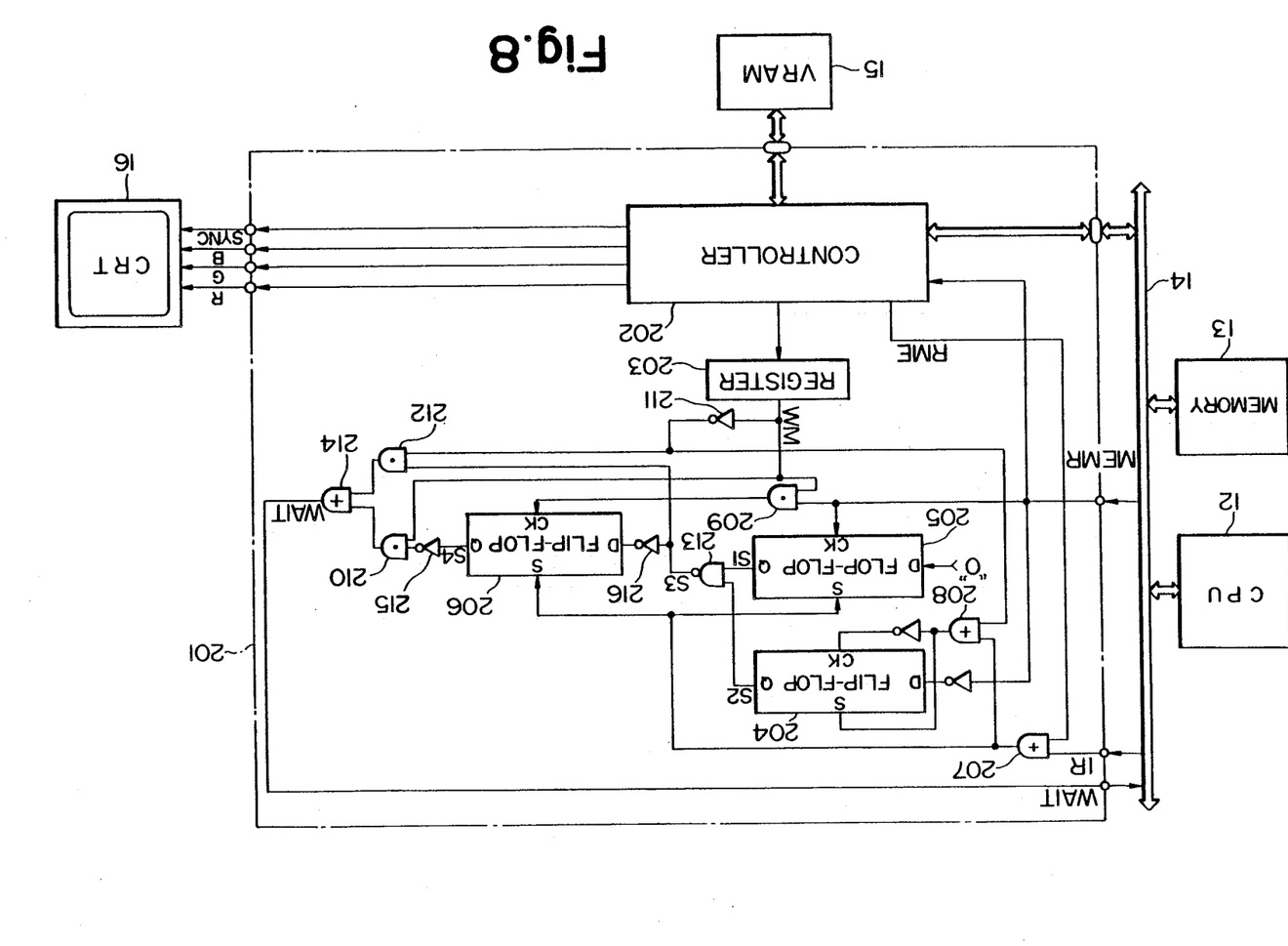
FIG. 8 is a block diagram showing an image display system employing a second embodiment of the image processing apparatus according to the present invention.
Figure 9:
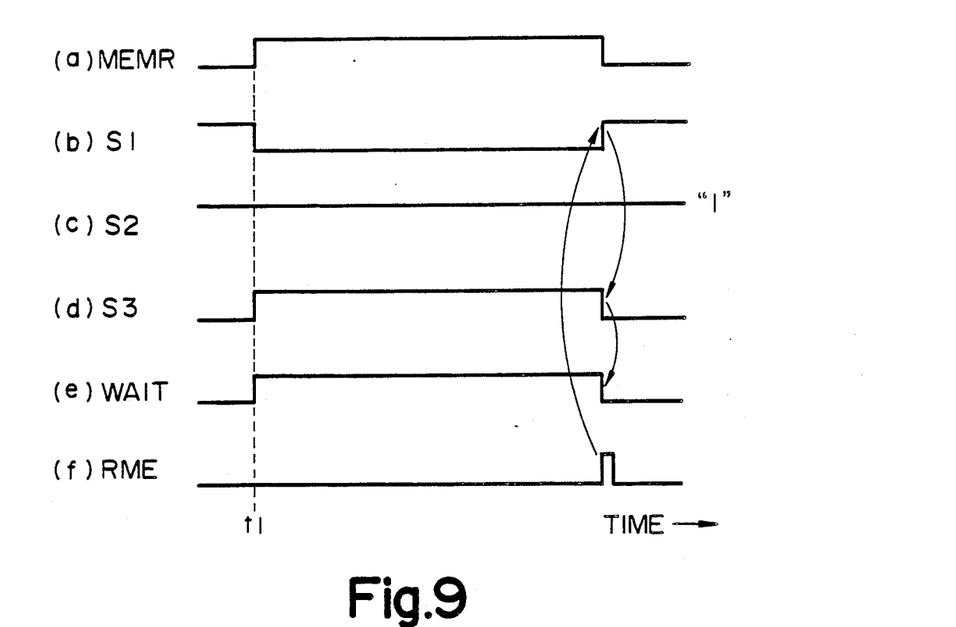
FIGS. 9 and 10 show time charts for explaining operations of the second embodiment.

Next, description will be given with respect to [I] FIRST EMBODIMENT in conjunction with FIGS. 4 to 7 and [II] SECOND EMBODIMENT in conjunction with FIGS. 8 to 10.

[I] FIRST EMBODIMENT (A) CONSTITUTION OF FIRST EMBODIMENT

Figure 4:
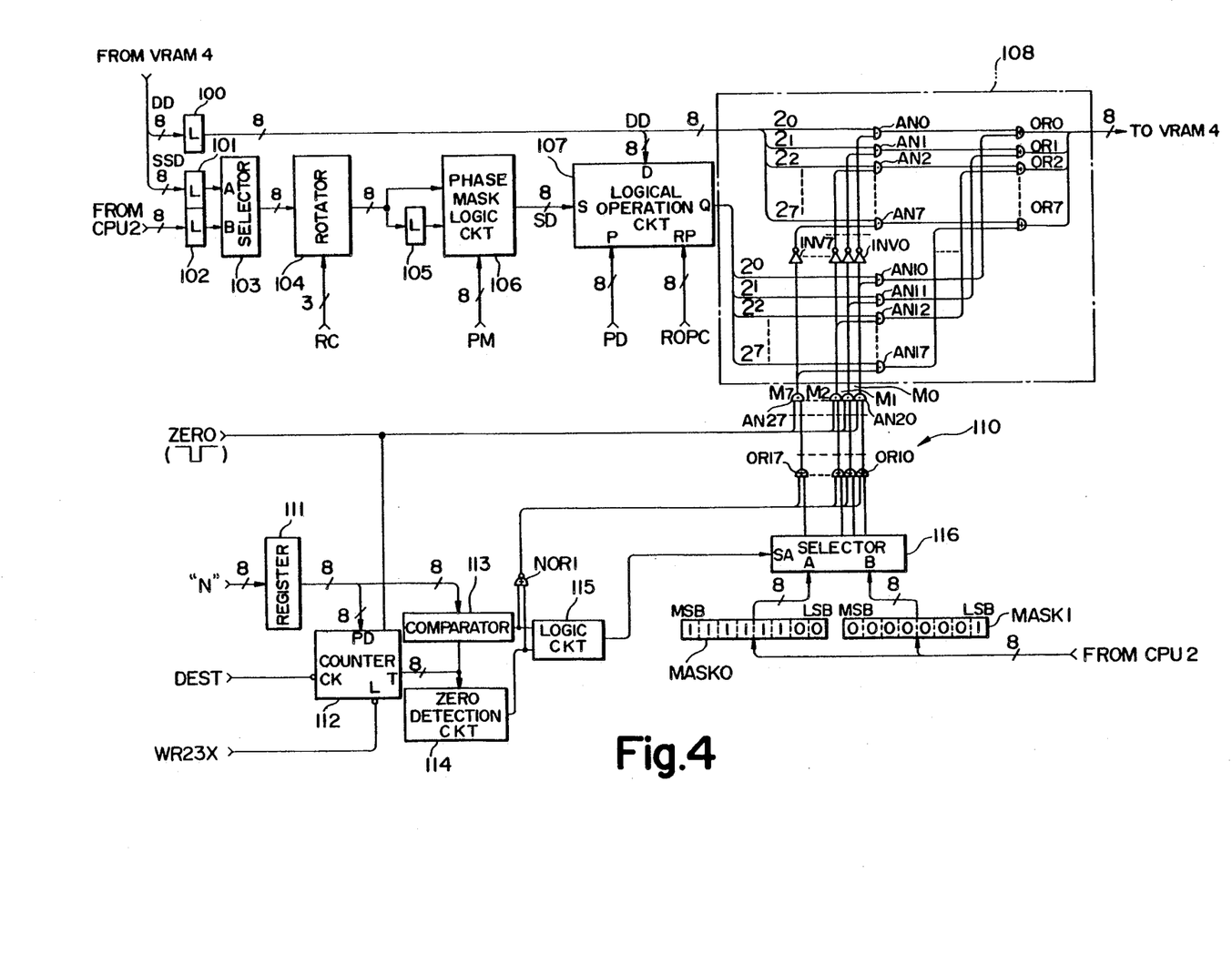
FIG. 4 is a block diagram showing a first embodiment of the image processing apparatus according to the present invention.

FIG. 4 is a block diagram showing the first embodiment of the image processing apparatus according to the present invention. In the first embodiment, the constitution of the portions other than the portion for the block transfer are similar to those of the conventional image processing apparatus, hence, description concerning such portions will be omitted, and description will be given only with respect to the portion for the block transfer in conjunction with FIG. 4. As described before, this first embodiment of the image processing apparatus constitutes the image display system as shown in FIG. 1 with the CPU 2 and the like. Thereafter, description will be given by considering that the one word of the VRAM 4 consists of eight bits.

In FIG. 4, 100, 101 and 102 all designate registers of eight bits. More specifically, the registers 100 and 101 are respectively written by destination data DD (of eight bits) and source data SSD (of eight bits) both of which are read from the VRAM 4 (shown in FIG. 1). On the other hand, the register 102 is written by the data supplied from the CPU 2. The source data SSD written in the register 101 and the data written in the register 102 are respectively supplied to input terminals A and B of a selector 103 wherein one of these two data are selected. In the case where the block transfer of the data is performed within the VRAM 4, the selector 103 selects the input terminal A thereof so as to selectively output the source data SSD therefrom. The data outputted from the selector 103 are supplied to a rotator 104 wherein a rotation process of a bit position is performed. This rotator 104 is supplied with control data RC of three bits which controls a number of shifting bits of the data which are subjected to the rotation process. Incidentally, detailed description will be given with respect to the operation of the rotator 104 later.

The data which are subjected to the rotation process in the rotator 104 are supplied to an input terminal of a phase mask logic circuit 106 and an old data latch register 105 as well. The phase mask logic circuit 106 is supplied with data of total two bytes including the rotated data (from the rotator 104) and the latched data (from the old data latch register 105). Hence, the phase mask logic circuit 106 extracts data (source data SD) of continuing eight bits from the above data of two bytes. In this case, control data PM (of eight bits) determines which data of eight bits are extracted from the data of two bytes in the phase mask logic circuit 106.

Next, a logical operation circuit 107 performs several kinds of operations by using the destination data DD, the source data SD outputted from the phase mask logic circuit 106 and pattern data PD read from a predetermined storing area (not shown). An example of such operation is performed based on the following formula.

$$Q = k_7 P S D + k_6 \overline{P} S D + k_5 P \overline{S} D + k_4 P S \overline{D} + k_3 \overline{P} S \overline{D} + k_2 \overline{P} \overline{S} D + k_1 P \overline{S} \overline{D} + k_0 \overline{P} \overline{S} \overline{D} \quad (1)$$

In the above formula, characters P, S and D represent the data PD, SD and DD respectively, and each character with a bar "—" means an inverted value of the corresponding data. In addition, each of coefficients $k_0$ to $k_7$ represents each bit value of control data ROPC of eight bits which are supplied to the logical operation circuit 107. By properly setting each bit value of the control data ROPC, it is possible to perform all kinds of operations using the data PD, SD and DD.

Next, a mask logic circuit 108 is controlled by a mask control circuit 110 so as to select and output one of the destination data DD (from the register 100) and data outputted from the logical operation circuit 107 by every bits. The output data of the mask logic circuit 108 are written in the VRAM 4 (shown in FIG. 1).

The above-mentioned mask logic circuit 108 has the following circuit constitution.

In the mask logic circuit 108, 0-bit to 7-bit of the destination data DD are respectively supplied to first input terminals of AND gates AN0 to AN7, and 0-bit to 7-bit of the data outputted from the logical operation circuit 107 are respectively supplied to first input terminals of AND gates AN10 to AN17. Meanwhile, the mask control circuit 110 outputs data constituted by bits $M_0$ to $M_7$. These bits $M_0$ to $M_7$ are inverted by inverters $INV_0$ to $INV_7$ and inverted bits thereof are respectively supplied to second input terminals of the AND gates AN0 to AN7. In addition, the bits $M_0$ to $M_7$ are directly and respectively supplied to second input terminals of the AND gates AN10 to AN17. The output signals of the AND gates AN0 to AN7 are respectively supplied to first input terminals of OR gates OR0 to OR7, and the output signals of the AND gates AN10 to AN17 are respectively supplied to second input terminals of OR gates OR0 to OR7. The output signals of the OR gates OR0 to OR7 constitute data of eight bits, and such data are supplied to the VRAM 4.

Next, description will be given with respect to the mask control circuit 110. A register 111 of eight bits is written by data representative of a word number "N" of one line in which transfer data is included, and output data of the register 111 are supplied to a preset terminal PD of a counter 112 and a first input terminal of a comparator 113. In this case, the word number "N" is determined as follows: "N"="0" when a word length of the transfer data within one line is smaller than one word; "N"="1" when the word length of the transfer data is longer than one word but smaller than two words; "N"="2" when the word length of the transfer data is longer than two words but smaller than three words.

The counter 112 counts down a pulse DEST supplied to a clock terminal CK thereof while a terminal T thereof is supplied with a signal having a "1" level (i.e., a "1" signal), and the counter 112 loads preset data supplied to the preset terminal PD thereof when a terminal L thereof is supplied with a signal having a "0" level (i.e., a "0" signal). The above pulse DEST is a control signal for a read modify write operation performed on the destination area described before. More specifically, a read operation is performed when the pulse DEST has the "0" level, and a write operation is performed when the pulse DEST has the "1" level. The counter 112 outputs data representative of a count value thereof to a second input terminal of the comparator 113 and an input terminal of a zero detection circuit 114 as well.

The comparator 113 outputs the "1" signal when the data at the first input terminal thereof coincide with the data at the second input terminal thereof. The zero detection circuit 114 detects a count value "0" of the counter 112 so as to output the "1" signal. A logic circuit 115 outputs the "1" signal when the comparator 113 outputs the "1" signal. On the contrary, the logic circuit 115 outputs the "0" signal when the zero detection circuit 114 outputs the "1" signal. The output signal of the logic circuit 115 is supplied to a select terminal SA of a selector 116. This selector 116 selects an input terminal A thereof when the "1" signal is supplied to the select terminal SA thereof. On the contrary, the selector 116 selects an input terminal B thereof when the "0" signal is supplied to the select terminal SA thereof. These input terminals A and B of the selector 116 are supplied with respective output data of mask registers MASK0 and MASK1. These mask registers MASK0 and MASK1 are supplied with respective mask data of eight bits from the CPU 2 (shown in FIG.

1). The functions of these mask registers MASK0 and MASK1 will be described later.

Next, a NOR gate NOR1 has a first input terminal connected to an output terminal of the comparator 113 and a second input terminal connected to an output terminal of the zero detection circuit 114. The NOR gate NOR1 outputs the "1" signal when both of the comparator 113 and the zero detection circuit 114 output the "0" signals, i.e., while the counter 112 counts down the count value thereof from "N−1" to "1" at a first stage. The output terminal of the NOR gate NOR1 is connected to each of first input terminals of the OR gates OR10 to OR17, and second input terminals of the OR gates OR10 to OR17 are respectively connected to bit output terminals of the selector 116. The output signals of the OR gates OR10 to OR17 are respectively supplied to first input terminals of AND gates AN20 to AN27, and a signal ZERO (which will be described later) is supplied to each of second input terminals of the AND gates AN20 to AN27.

(B) OPERATION OF FIRST EMBODIMENT

Next, description will be given with respect to the operations of the first embodiment. In this case, the following description will be given by considering that the first embodiment employs a mode (or a bit map method) in which each bit of data stored in the VRAM 4 corresponds to each one dot of the display screen, for example.

(1) INITIALIZING OPERATION

Figure 5:
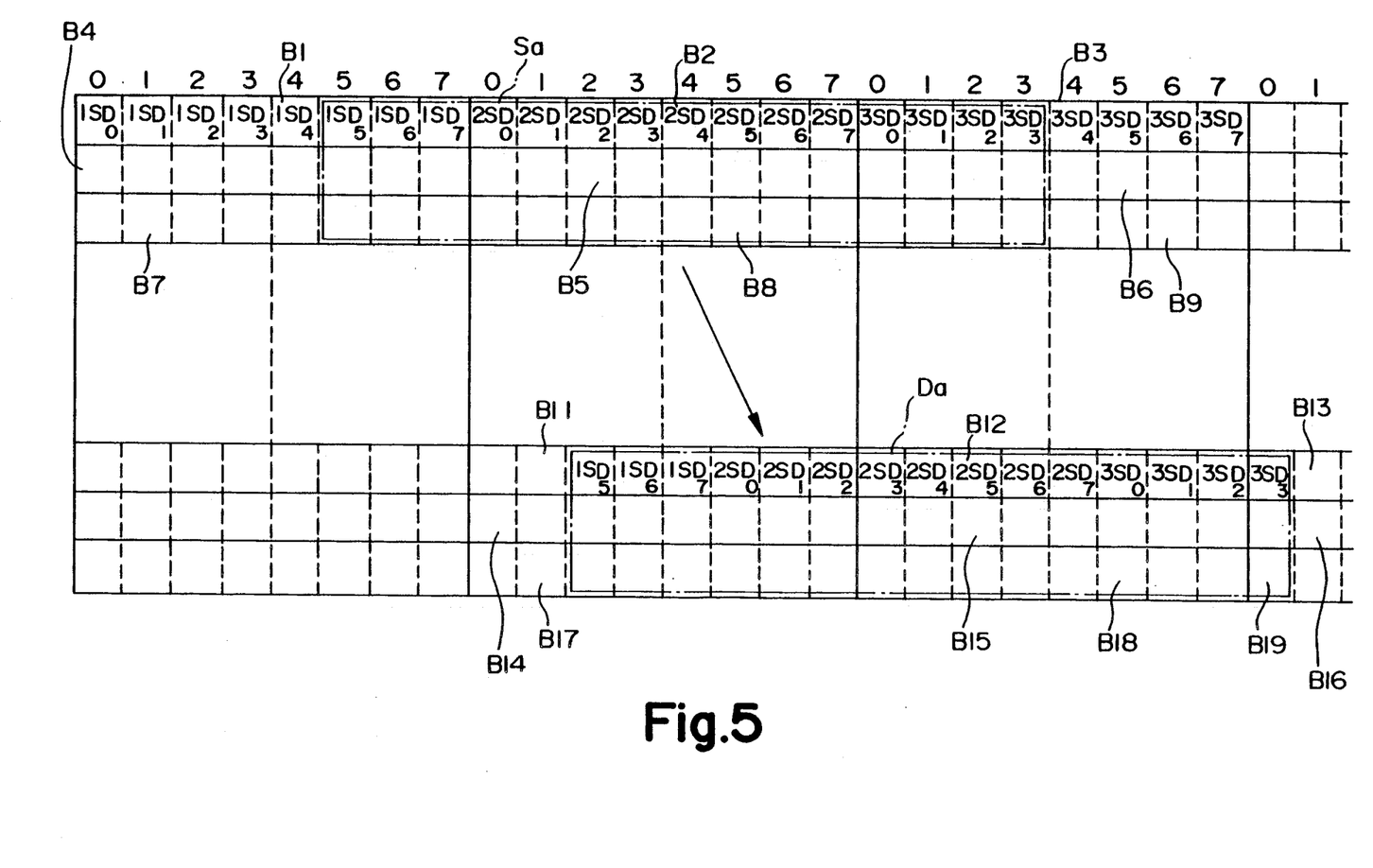
FIG. 5 shows a memory map for explaining the transfer operation of the first embodiment.

As shown in FIG. 5, a source area Sa and a destination area Da are set respectively. More specifically, the source area Sa lies between bytes B1 to B9. One boundary of the source area Sa is located at middle points of bytes B1, B4 and B7, and other boundary of the source area Sa is located at middle points of bytes B3, B6 and B9. On the other hand, the destination area Da lies between bytes B11 to B19. One boundary of the destination area Da is located at middle points of bytes B11, B14 and B17, and other boundary of the destination area Da is located at middle points of bytes B13, B16 and B19.

In the above-mentioned memory map, the CPU 2 writes a value "2" corresponding to a transfer word length within one line into the register 111 and the CPU 2 also writes the mask data into the mask registers MASK0 and MASK1 at first. In the mask data, the value "0" is set to bits to which data are not transferred and the value "1" is set to other bits to which data are transferred. The mask register MASK0 is written by mask data at a start portion of each line of the destination area, and the mask register MASK1 is written by mask data at an end portion of each line of the destination area. As is apparent from FIG. 5, the mask register MASK0 is written by mask data of (11111100). Because, the destination area Da starts from 2-bit positions of the bytes B11, B14 and B17 so that the transfer data are not written in 0-bit and 1-bit positions of the bytes B11, B14 and B17. As is apparent from FIG. 5, the mask register MASK1 is written by mask data of (00000001). In FIG. 5, the most significant bit (MSB) is located at a right position, and the least significant bit (LSB) is located at a left position. In other words, FIG. 5 shows a memory map which has a bit arrangement reverse to that of the above mask data which are written by binary display data.

(2) TRANSFER OPERATION

After the above-mentioned initializing operation is completed, a transfer operation will be performed.

The transfer operation is basically identical to a transfer of each one byte. In the transfer operation, the following operations are sequentially performed. At first, data (of one byte) are read from the source area Sa, and an access is given to the byte area to be written within the destination area Da so that the read modify write operation is performed on such byte area. In the read modify write operation, bits to which data are not transferred are discriminated based on the mask data stored in the mask register MASK0 or MASK. In this case, original data are rewritten in the bits to which data are not transferred.

Next, detailed description will be given with respect to the transfer operation. First, the access is given to the byte B1 within the source area Sa, from which data having bits 1SD$_0$ to 1SD$_7$ are read. Such data are written in the register 101. Thereafter, the data having bits 1SD$_0$ to 1SD$_7$ are passed through the selector 103 and supplied to the rotator 104 wherein the rotation process of the bit position is performed on such data.

Figure 6A:
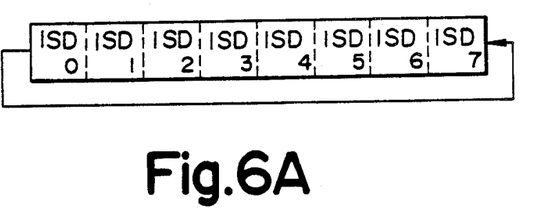
FIGS. 6A to 6E show bit arrangements of the transfer data for explaining a rotation process of a rotator.
Figure 6B:
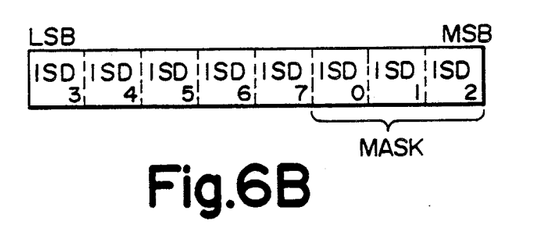

The above-mentioned rotation process is performed in the case where the bit positions of the transfer data within the source area Sa are different from those of the transfer data within the destination area Da. For example, the rotation process must be performed when bits 1SD$_5$ to 1SD$_7$ constituting the transfer data within the byte B1 are transferred to 2-bit to 4-bit positions of the byte B11 respectively. In this case, since the rotation process is performed in a counterclockwise direction as shown in FIG. 6A in the present embodiment, the number of shifting bits must be equal to three. FIG. 6B shows the source data which have been already subjected to the rotation process. This number of shifting bits are designated by the control data RC of three bits in the rotator 104 so that one of the numbers "0" to "7" is selected. The CPU 2 controls the value of the control data RC so that the value of the control data RC corresponds to the bit position of the destination area.

Next, the source data which have been subjected to the rotation process in the rotator 104 are written in the old data latch register 105 and supplied to the phase mask logic circuit 106. This phase mask logic circuit 106 performs a predetermined phase mask process between preceding source data stored in the old data latch register 105 and present source data supplied from the rotator 104. However, these present and preceding source data have not been supplied to the phase mask logic circuit at this stage. Hence, the phase mask process is not performed at this stage, and description thereof will be omitted.

At next stage, the access is given to the byte B11 where the destination area Da lies so that the read modify write operation is performed. More specifically, data stored in the byte B11 are read out and loaded in the register 100, from which such data are read and rewritten in the byte B11 via the mask logic circuit 108. In this first read modify write operation, bits of data to be transferred to the byte B11 (shown in FIG. 5) are not provided all together, hence, the data read from the byte B11 are directly written in the byte B11. More specifically, the signal ZERO (having the "0" level) is supplied to the image processing apparatus shown in FIG. 4 in the first read modify write operation, whereby the output signals of the AND gates AN20 to AN27 are all turned to the "0" signals so that the AND gates AN0 to AN7 are opened and the other AND gates AN10 to AN17 are closed. As a result, the output data of the logical operation circuit 107 are cut off by the AND gates AN10 to AN17, hence, such output data do not effect the destination data DD any more. Therefore, the destination data DD within the byte B11 are sequentially passed through the AND gates AN0 to AN7 and the OR gates OR0 to OR7 and then directly written in the byte B11 again.

FIGS. 7(a) to 7(e) show waveforms at several portions of the apparatus shown in FIG. 4. FIG. 7(a) shows a waveform of a clock signal CL which synchronizes signals at several portions of the apparatus shown in FIG. 4, and a signal WRG23X is outputted in synchronism with the clock signal CL. The level of this signal WRG23X falls down at a time $t_1$ so that the value "N" of data written in the register 111 is preset in the counter 112. In this case, the value "N" equals to "2". In addition, the signal ZERO turns down to the "0" signal at the time $t_1$ and then turns up to the "1" signal at an end timing of the read modify write operation performed on the destination area (i.e., at a time $t_2$ when the level of the signal DEST first falls down). As described before, the signal ZERO turns down to the "0" signal so that the data read from the byte B11 are directly rewritten in the byte B11 in the first read modify write operation performed on the destination area Da. Since the signal ZERO is supplied to a trigger terminal T of the counter 112, the counter 112 does not perform a count operation while the signal ZERO is identical to the "0" signal. As a result, the count value of the counter 112 does not change and equal to the value "N" at the time $t_2$. As described heretofore, a first data transfer process is performed.

Figure 6C:
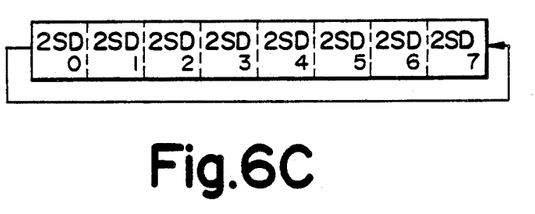
Figure 6D:
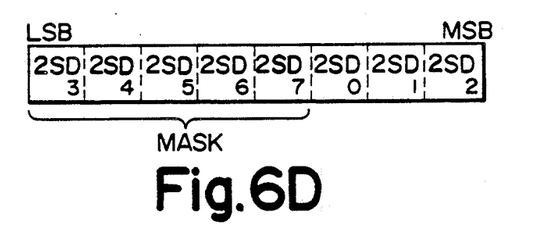

Next, the data stored in the byte B2 within the source area Sa are read out and then supplied to the rotator 104 wherein such data are subjected to the rotation process at a first stage of a second data transfer process. Similar to the former rotation process described before, three bits of the transfer data are shifted as shown in FIGS. 6C and 6D in this rotation process (because the same number of shifting bits is set to all bytes). The data which have been subjected to the rotation process in the rotator 104 are supplied to the phase mask logic circuit 106 and such data are also supplied to the old data latch register 105 so that the data stored in the register 105 ar renewed. Hence, the phase mask logic circuit 106 performs a predetermined process on the data of byte B1 stored in the register 105 and the data of the byte B2 (as shown in FIGS. 6B and 6D) which are newly supplied from the rotator 104.

Next, description will be given with respect to the above-mentioned predetermined process. First, the rotator 104 newly supplies data of byte B2 to the phase mask logic circuit 106 wherein 0-bit to 4-bit of the data of byte B2 are masked as shown in FIG. 6D. In addition, the phase mask logic circuit 106 masks 5-bit to 7-bit of data of byte B1 supplied from the old data latch register 105 as shown in FIG. 6B. Thereafter, the phase mask logic circuit 106 adds the masked data of byte B1 with the masked data of byte B2 to thereby obtain data shown in FIG. 6E. Comparing the data shown in FIG. 6E with the data shown in FIG. 5, bits $1DS_5$ to $1DS_7$ and bits $2DS_0$ to $2DS_2$ of the data to be transferred to the byte B11 are provided all together and the bit positions thereof are all arranged to proper bit positions to be transferred.

Next, description will be given with respect to the general formula for a data mask process and a data adding process of the phase mask logic circuit 106. Meanwhile, the control data PM determines which bits are to be masked, and the value of such control data PM are determined in response to the number of shifting bits in the rotation process. The following Table 1 (see next page) shows relations between the number of shifting bits and the value of the control data PM.

TABLE 1

| The Number of Shifting Bits In the Rotation Process | The Value of the Data PM |
|---|---|
| 0 | $(FF)_H$ |
| 1 | $(7F)_H$ |
| 2 | $(3F)_H$ |
| 3 | $(1F)_H$ |
| 4 | $(0F)_H$ |
| 5 | $(07)_H$ |
| 6 | $(03)_H$ |
| 7 | $(01)_H$ |

In the above Table 1, the left-side number "3" of the value $(3F)_H$ of the control data PM (of eight bits) represents a value of upper four-bit data within the control data PM and the right-side number "F" represents a value of lower four-bit data within the control data PM, for example. Hence, the value $(3F)_H$ equals to a value of data (00111111).

When the present data supplied from the rotator 104 are designated by a character RS and the preceding data supplied from the old data latch register 105 are designated by a character ORS, the phase mask logic circuit 106 generates data ns by using two data RS and ORS based on the following formula (2).

$$ns = RS.PM + ORS.\overline{PM} \qquad (2)$$

By performing the operation based on the above formula (2) in the phase mask logic circuit 106, any number of shifting bits can be translated into the control data PM so that the bit positions of the transfer data can be adjusted properly.

Next, the masked data ns outputted from the phase mask logic circuit 106 are passed through the logical operation circuit 107 and each bit thereof is supplied to each of the first input terminals of the AND gates AN10 to AN17 within the mask logic circuit 108. In order to perform the read modify write operation on the destination area Da, the register 100 reads the data of byte B11. Next, in order to perform the write operation, the data stored in register 100 are supplied to the mask logic circuit 108. Since the count value of the counter 112 is still maintained at the value "N" at a time when the above write operation is performed, the comparator 113 shown in FIG. 4 detects that the count value of the counter 112 coincides with the value "N" so that the "1" signal is outputted from the comparator 113. Due to the "1" signal outputted from the comparator 113, the logic circuit 115 outputs the "1" signal so that the selector 116 selects the input terminal A thereof. In addition, the signal ZERO is identical to the "1" signal at this time (because the signal ZERO turns to the "1" signal from the time $t_2$ shown in FIG. 7), hence, the NOR gate NOR1 outputs the "0" signal. Therefore, data (11111100) stored in the mask register MASK0 are supplied to the input terminal A of the selector 116, and the bits thereof are passed through the OR gates OR17 to OR10 and the AND gates AN27 to AN20 sequentially and then supplied to the second input terminals of the AND gates AN17 to AN10 respectively. In addition, the above data stored in the mask register MASK0 are inverted in the inverters INV7 to INV0 and then supplied to the second input terminals of the AND gates AN7 to AN0.

When the data stored in the mask register MASK0 are supplied to the second input terminals of the AND gates AN10 to AN17 as described above and the phase mask logic circuit 106 outputs the data ns (see FIG. 6E) via the logical operation circuit 107, the 0-bit and 1-bit of the data ns are not passed through the AND gates AN10 and AN11 which are closed, but the 2-bit to 7-bit thereof are supplied to the second input terminals of the OR gates OR2 to OR7 via the AND gates AN12 to AN17 respectively.

Meanwhile, the data stored in the mask register MASK0 are inverted in the inverters INV0 to INV7 and the inverted data thereof are supplied to the AND gates AN0 to AN7. Hence, 2-bit to 7-bit of the destination data of byte B11 outputted from the register 100 are not passed through the AND gates AN2 to AN7 which are closed, but 0-bit and 1-bit thereof are supplied to the second input terminals of the OR gates OR0 and OR1 via the AND gates AN0 and AN1 respectively.

Figure 6E:
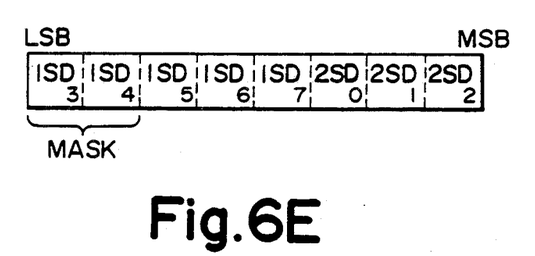

According to the above-mentioned operation, 0-bit and -bit of the data of byte B11 are directly outputted as 0-bit and 1-bit of the output data of the mask logic circuit 108. In addition, 2-bit to 7-bit of the data shown in FIG. 6E are outputted as 2-bit to 7-bit of the output data of the mask logic circuit 108. These 2-bit to 7-bit of the data shown in FIG. 6E is identical to the data of six bits which are obtained by changing the bit positions and then combining the data of bytes B1 and B2 within the source area. As a result, the bits $1SD_5$ to $1SD_7$ and the bits $2SD_0$ to $2SD_2$ constituting the transfer data are written in the 2-bit to 7-bit of the byte B11 respectively. On the other hand, the 0-bit and 1-bit of the byte B11 are rewritten by 0-bit and 1-bit of the data originally written therein. In other words, the data transfer is performed by using the bit boundary in the byte B11.

Figure 7:
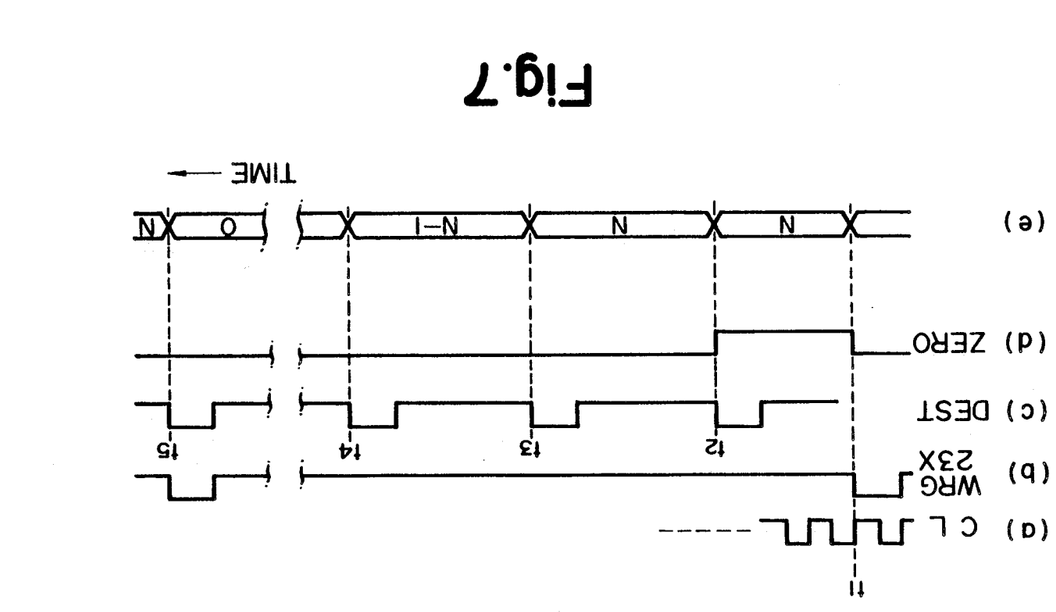
FIG. 7 shows waveforms at several portions of the apparatus shown in FIG. 4.

After the read modify write operation is completed as described heretofore, the level of the signal DEST turns up at a time $t_3$ shown in FIG. 7. At this time, the signal ZERO has been already turns up to the "1" signal. Hence, the counter 112 starts to count down the count value thereof so the the the count value varies from "N−1" to "1".

Next, the access is given to the byte B3 within the source area Sa to thereby read data having bits $3SD_0$ to $3SD_7$ therefrom, and then such data are subjected to the rotation process as described before. Thereafter, the phase mask logic circuit 106 performs the mask process and the addition process as described before by using the data having bits $3SD_0$ to $3SD_7$ which have been subjected to the rotation process and the data shown in FIG. 6D which have been already stored in the old data latch register 105. Thus, the phase mask logic circuit 106 produces data having bits $2SD_3$, $2SD_4$, $2SD_5$, $2SD_6$, $2SD_7$, $3SD_0$, $3SD_1$ and $3SD_2$. Then, the access is given to the byte B12 within the destination area in order to perform the read modify write operation, and the data of the byte B12 are stored in the register 100.

Meanwhile, the count value of the counter 112 reaches at the value "N−1" at the time $t_3$ shown in FIG. 7 so that both of the comparator 113 and the zero detection circuit 114 output the "0" signals. As a result, the NOR gate NOR1 outputs the "1" signal so that all of the OR gates OR10 to OR17 output the "1" signals. Thus, all of the AND gates AN0 to AN7 are closed and all of the AND gates AN10 to AN17 are opened in the mask logic circuit 108. Hence, the data stored in the destination area are masked and the output data ns of the phase mask logic circuit 106 are written in the VRAM 4. As a result, the data writing operation is performed on the byte B12 as shown in FIG. 5. At a time $t_4$ (shown in FIG. 7) when such data writing operation is completed, the counter 112 starts to count down so that the count value thereof reaches at "0".

Thereafter, the reading operation of the source area, the rotation process and the mask combining process are performed as described before, and then the read modify write operation is performed on the byte B13. At this read modify write operation, the count value of the counter 112 equal to "0" so that the zero detection circuit 114 outputs the "1" signal. Hence, the NOR gate NOR1 outputs the "0" signal and the selector 116 selects the input terminal B thereof. As a result, every bits of data (00000001) written in the mask register MASK1 are respectively and sequentially passed through the OR gates OR17 to OR10 and the AND gates AN27 to AN20, and then such data are supplied to the mask logic circuit 108 wherein such data are subjected to a mask logic process. Thus, the mask logic circuit 108 outputs data having 0-bit identical to the 0-bit of data outputted from the phase mask logic circuit 106 and also having 1-bit to 7-bit identical to those of the data which are originally written in the byte B13. In short, the 0-bit of the data of byte B13 is only exchanged in the above read modify write operation.

By performing the processes described heretofore, the data transfer is completed in a first line. At a time $t_5$ (shown in FIG. 7) when the data transfer is completely performed on the last data of the first line, the level of the signal WRG23X turns up so that the data representative of the value "N" stored in the register 111 are preset in the counter 112. Thus, the data transfer as described before will be performed on second lines of the source area and the destination area again.

Incidentally, the data transfers described heretofore are all performed by setting value "N" at "2" where the transfer data within one line lie between three words. The following Table 2 (see next page) shows relations between the value "N" and the output data of the mask control circuit 110 when the value "N" is varied in a range between values "0" to "n" (where n denotes a positive integral number).

TABLE 2

| N/RMW | 1st | 2nd | 3rd | 4th | 5th | ... (n + 2) |
|---|---|---|---|---|---|---|
| 0 | $(00)_H$ | MSK0 | | | | . |
| 1 | $(00)_H$ | MSK0 | MSK1 | | | . |
| 2 | $(00)_H$ | MSK0 | $(FF)_H$ | MSK1 | | . |
| 3 | $(00)_H$ | MSK0 | $(FF)_H$ | $(FF)_H$ | MSK1 | . |
| . | . | . | . | . | . | . |
| . | . | . | . | . | . | . |
| . | . | . | . | . | . | . |
| n | $(00)_H$ | MSK0 | $(FF)_H$ | $(FF)_H$ | $(FF)_H$ | ... MSK1 |

In the above Table 2, each of 1st, 2nd, ..., (n+2) in a first row represents times for repeatedly performing the read modify write operation (RMW). In addition, MSK0 and MSK1 represent the respective data stored in the mask registers MASK0 and MASK1. As shown in Table 2, the mask control circuit 110 normally outputs data $(00)_H$ in a first read modify write operation so that the data read from the destination area are rewritten in the destination area as it is. Because, all bits of the data to be written are not provided all together in a first reading operation performed on the source area (as show in FIG. 5) so that the data transfer can not be performed until a next reading operation is performed on the source area.

As shown in Table 2, in the case where the read modify write operation is performed by three times or more, the data MSK0 are outputted from the mask control circuit 110 at the second read modify write operation, and then the data MSK1 are outputted from the mask control circuit 110 at the last read modify write operation. Because, the first and last bytes of the data stored in the destination area include bits which are not subjected to the data transfer in order to maintain each of the values of such bits as it is. On the other hand, in the case where the data transfer is performed on some middle bytes within one line of the destination area, the mask control circuit 110 outputs the data $(FF)_H$. Because, the data transfer must be performed on all bits of the data of such middle bytes.

Meanwhile, when the reading operation is performed on the first byte within the source area, bits of the transfer data are not provided all together in the above-mentioned data transfer. However, the above bits of the transfer data are provided all together in the cases where a number of significant bits in the source area is relatively large and a number of transfer bits in the destination area is relatively small. In such cases, the mask control circuit 110 may output the data MSK0 because certain data can be written in predetermined bit positions of the destination area in the first read modify write operation. The following Table 3 (see next page) shows relations between the value "N" and the output data of the mask control circuit 110 in such cases.

TABLE 3

| N/RMW | 1st | 2nd | 3rd | 4th | 5th | ... (n + 2) |
|---|---|---|---|---|---|---|
| 0 | MSK0 | | | | | . |
| 1 | MSK0 | MSK1 | | | | . |
| 2 | MSK0 | $(FF)_H$ | MSK1 | | | . |
| 3 | MSK0 | $(FF)_H$ | $(FF)_H$ | MSK1 | | . |
| . | . | . | . | . | . | . |
| . | . | . | . | . | . | . |
| . | . | . | . | . | . | . |
| n | MSK0 | $(FF)_H$ | $(FF)_H$ | $(FF)_H$ | $(FF)_H$ | ... MSK1 |

In this case, one of two processes of the mask control circuit 110 shown in Tables 2 and 3 is selected by whether the signal ZERO turns down to the "0" signal at a predetermined timing or not. More specifically, the first embodiment sets the signal ZERO at the "0" signal in a period between times $t_1$ and $t_2$ shown in FIG. 7 as described before, whereby the mask control circuit 110 outputs the data $(00)_H$ at the first read modify write operation. In addition, the counter 112 is inhibited from counting down the count value thereof in the above-mentioned period. Hence, the counter 112 must count down the count value thereof by one more additional to that in the case where the signal ZERO does not turn to the "0" signal. Due to such process for counting down, the mask control circuit 110 can output data as shown in Table 2.

On the other hand, the mask control circuit 110 must normally set the level of the signal ZERO at the "1" level in order to output the data as shown in Table 3. As a result, the counter 112 can start to count down the count value thereof from the first timing because the counter 112 is not inhibited from counting down the count value thereof. In addition, the signal ZERO having the "1" level does not close the AND gates AN20 to AN27, hence, the mask control circuit 110 can output the data as shown in Table 3.

Incidentally, the CPU 2 outputs a predetermined mode signal or a predetermined flag in accordance with the judgment thereof depending on relations between the bit positions of the source and destination areas. Due to such mode signal or flag, the level of the signal ZERO is determined so that the signal ZERO is turned to the "0" signal at the predetermined timings or the signal ZERO is normally maintained at the "1" signal.

Meanwhile, the first embodiment presets a plurality of operations in the logical operation circuit 107, and each of these operations is arbitrarily selected. Hence, the first embodiment is advantageous in that it is possible to simultaneously select the operation corresponding to the present condition.

In addition, the first embodiment automatically selects one of the mask data MSK0 and MSK1. Hence, the first embodiment is advantageous in that the CPU 2 is not overloaded when the data transfer is performed by using the bit boundaries.

[II] SECOND EMBODIMENT (A) CONSTITUTION OF SECOND EMBODIMENT

Next, description will be given with respect to the second embodiment of the present invention in conjunction with FIG. 8. FIG. 8 is a block diagram showing the image display system employing the second embodiment of the present invention. More specifically, the image display system shown in FIG. 8 employs an image processing apparatus 201 instead of the image processing apparatus 11 shown in FIG. 3. In FIG. 8, the parts corresponding to those shown in FIG. 3 will be designated by the same characters. In the image processing apparatus 201, a controller 202 writes the display data outputted from the CPU 12 into the VRAM 15 and then reads such display data from the VRAM 15 in accordance with the timing of the dot clock. Such display data are converted into color signals R, G and B, and these color signals with the synchronizing signal SYNC are then supplied to the CRT display unit 16. In addition, the controller 202 writes wait control data of one bit (which will be described later in detail) in a register 203. Further, the controller 202 outputs a read memory end signal REM at a time when the controller 202 reads the display data from the VRAM 15. Meanwhile, characters 204 to 206 designate the same D flip-flop which is set when the "1" signal is supplied to a set terminal S thereof and which reads data supplied to data input terminal D thereof at a leading edge timing of a pulse signal supplied to a clock terminal CK thereof.

(B) OPERATION OF SECOND EMBODIMENT

Next, description will be given with respect to the operation of the image display system shown in FIG. 8.

First, when a power is inputted to this system, the CPU 12 outputs an initial reset signal IR to the set terminals S of the flip-flops 205 and 206 via an OR gate 207. Due to this initial reset signal IR, both of the flip-flops 205 and 206 are set so that each of these flip-flops 205 and 206 output the "1" signal from an output terminal Q thereof. In addition, the initial reset signal IR is supplied to the set terminal S of the flip-flop 204 via OR gates 207 and 208 in series, whereby the flip-flop 204 is set. Then, the CPU 12 sequentially outputs and reads the display data in the VRAM 15 via the controller 202. Thereafter, the controller 202 repeatedly reads the display data from the VRAM 15 and converts such display data into the color signals which will be outputted to the CRT display unit 16 with the synchronizing signal. Thus, the display operation is performed based on the display data stored in the VRAM 15.

Next, description will be given with respect to the operation in which the CPU 12 reads the display data from the VRAM 15 in the case where the above-mentioned display operation is performed on the CRT display unit 16. In such operation, the CPU 12 outputs the wait control data to the controller 202 at first. More specifically, the CPU 12 sets the value of the wait control data at "0" so as to select a wait mode when the CPU 12 reads the data from the VRAM 15, while the CPU 12 sets the value of the wait control data at "1" so as to select a not-wait mode when the CPU 12 does not read the data from the VRAM 15. Such wait control data are written in the register 203 by the controller 202, and then such wait control data are outputted from the register 203 as a wait control signal WM. Thereafter, the CPU 12 outputs addresses for the VRAM 15 and a memory read signal MEMR (having the "1" level) independently. Next, description will be given with respect to sequential operations of the wait mode and the not-wait mode which will be performed after the above-mentioned operation independently.

(1) WAIT MODE

In this wait mode, the wait control signal WM is identical to the "0" signal so that the AND gates 209 and 210 are both closed. In addition, an inverter 211 outputs the "1" signal so that an AND gate 212 is opened.

At a time t1 when the memory read signal MEMR turns up to the "1" signal as shown in FIG. 9(a), the flip-flop 205 reads data representative of a value "0" so that an output signal S1 (shown in FIG. 9(b)) of the flip-flop 205 turns down to the "0" signal. As a result, an output signal S3 (shown in FIG. 9(d)) of a NAND gate 213 turns up to the "1" signal, and such "1" signal is outputted as a wait signal WAIT (shown in FIG. 9(e)) via an AND gate 212 and an OR gate 214 in series. Such wait signal WAIT (i.e., the "1" signal) is supplied to the CPU 12 via the bus line 14 so that the CPU 12 is subjected to a wait state. Meanwhile, when the controller 202 waits for a timing enabling a memory access for the CPU 12 after the controller 202 is supplied with the above-mentioned memory read signal MEMR and the addresses for the VRAM 15, the controller 202 reads the data from the VRAM 15 and outputs the read memory end signal RME (shown in FIG. 9(f)). Thereafter, the controller 202 outputs the data read from the VRAM 15 to the bus line 14. The above-mentioned read memory end signal RME is supplied to the set terminal S of the flip-flop 205 via the OR gate 207, whereby the flip-flop 205 is set to thereby turn the output signal S1 thereof up to the "1" signal. At this time, the signal S2 (shown in FIG. 9(c)) is also identical to the "1" signal. Hence, the signal S3 turns down to the "0" signal so that the wait signal WAIT turns down to the "0" signal again. Just after a time when the wait signal WAIT turns down to the "0" signal, the CPU 12 reads the data outputted from the controller 202.

As described heretofore, the image processing apparatus 201 outputs the wait signal WAIT to the CPU 12 when the CPU 12 outputs the memory read signal MEMR and the addresses for the VRAM 15 in the wait mode.

(2) NOT-WAIT MODE

In the not-wait mode, the wait control signal WM turns up to the "1" signal, whereby the AND gates 209 and 210 are both opened but the AND gate 212 is closed. At a time t2 when the memory read signal MEMR turns up to the "1" signal as shown in FIG. 10, the output signal S1 (shown in FIG. 10(b)) of the flip-flop 205 is turned down to the "0" signal, while an output signal S4 (shown in FIG. 10(e)) of the flip-flop 206 is turned up to the "1" signal. Due to such signal S4, the inverter 215 outputs the "0" signal to thereby turn the output signal of the AND gate 210 down to the "0" signal. Hence, the level of the wait signal WAIT is maintained at the "0" level. In other words, the wait signal WAIT is not turned up to the "1" signal so that the CPU 12 will not be subjected to the wait state even when the memory read signal MEMR turns up to the "1" signal in the not-wait mode. For this reason, the CPU 12 inputs dummy data outputted on the bus line 14 by a predetermined timing (i.e., without standby).

As described before, the controller 202 waits for the timing enabling the memory access for the CPU 12. Then, the controller 202 reads the display data from the VRAM 15 and outputs the read memory end signal RME.

Figure 10:
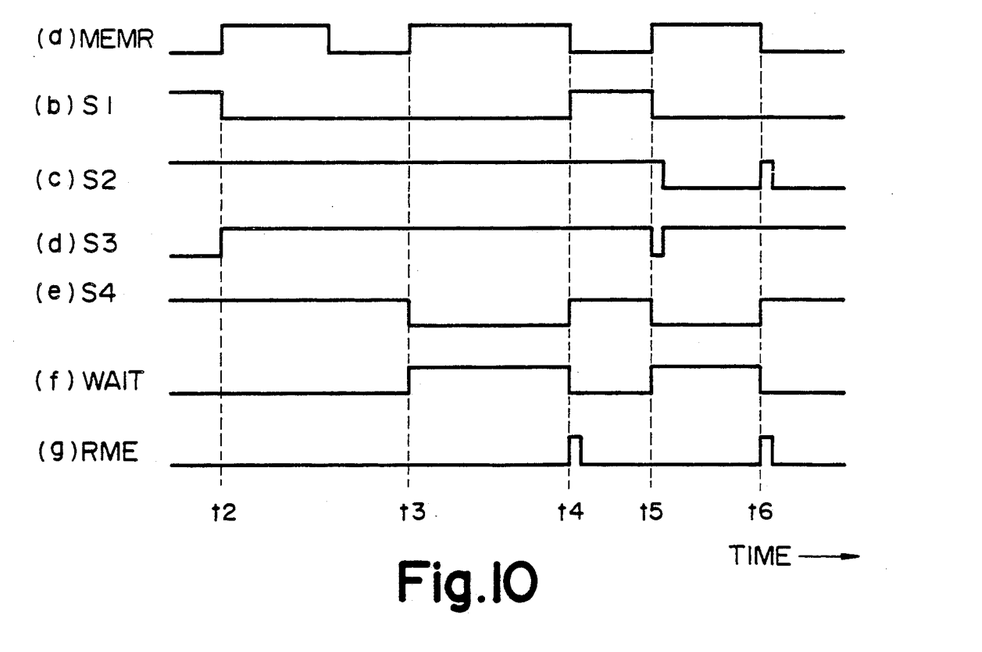

Next, the CPU 12 outputs the memory read signal MEMR and the addresses for the VRAM 15 again at a time t3 shown in FIG. 10. If such time t3 passes after the reading operation of the VRAM 15 has been completed and the controller 202 has already outputted the read memory end signal RME, the operation similar to the above-mentioned operation will be performed again. In this case, the wait signal WAIT is not outputted to the CPU 12. On the contrary, if the time t3 passes before the reading operation of the VRAM 15 has been completed, a specific operation different from the above-mentioned operation will be performed.

Next, description will be given with respect to such specific operation. At the time t3 when the signal MEMR turns up to the "1" signal as shown in FIG. 10, the output signal S4 (shown in FIG. 10(e)) of the flip-flop 206 turns down to the "0" signal because the output signal of the inverter 216 is identical to the "0" signal. Hence, the output signal of the inverter 215 turns up to the "1" signal, and such "1" signal is outputted to the CPU 12 as the wait signal WAIT via the AND gate 210 and the OR gate 214 in series as shown in FIG. 10(f). In other words, the CPU 12 is subjected to the wait state at this time t3. At a next time t4 when the reading operation corresponding to the first memory read signal MEMR is completed, the controller 202 outputs the read memory end signal RME shown in FIG. 10(g). Due to such read memory end signal RME, the flip-flop 206 sets the level of the output signal S4 thereof at the "1" level. Hence, the output signal of the inverter 215 turns down to the "0" signal and the wait signal WAIT turns down to the "0" signal again. Just after a time when the wait signal WAIT turns down to the "0" signal, the CPU 12 starts to read the dummy data.

At a next time t5, the memory read signal MEMR turns up to the "1" signal, but a reading operation of the VRAM 15 corresponding to a second memory read signal MEMR has not been completed. In this case, the wait signal WAIT turns up to the "1" signal as described before when the signal MEMR turns up to the "1" signal, whereby the CPU 12 is subjected to the wait state. At a next time t6 when the controller 202 outputs the read memory end signal RME, the wait signal WAIT turns down to the "0" signal again.

As described heretofore, when the CPU 12 outputs the memory read signal MEMR in the not-wait mode, the image processing apparatus 201 does not output the wait signal WAIT in principle. On the contrary, the image processing apparatus 201 outputs the wait signal WAIT to the CPU 12 in the case where the reading operation of the VRAM 15 corresponding to the preceding wait signal WAIT has not been completed yet.

This invention may be practiced or embodied in still other ways in addition to the first and second embodiments described heretofore without departing from the spirit or essential character thereof. Therefore, the preferred embodiments described herein are illustrative and not restrictive, the scope of the invention being indicated by the appended claims and all variations which come within the meaning of the claims are intended to be embraced therein.

What is claimed is:

1. An image processing apparatus which processes image data stored in a memory to thereby display an image on a display screen of a display unit under control of a central processing unit comprising:
    (a) transfer data generating means for reading source data from data sources, including one word area, and an area of continuing two words provided within a source area, so as to generate transfer data of one word having bits which are required for a certain word area within a destination area, said transfer data being obtained by shifting bits of said source data such that bit positions of shifted source data correspond to those of destination area and by extracting predetermined continuing bits of one word from said shifted source data;
    (b) first and second memory means which are written by first and second mask data respectively, each of said first and second mask data selectively permitting a data transfer to be performed on every bit of first and last words within one line of said destination area;
    (c) mask means for masking said first and last words within one line based on said first and second mask data stored in said first and second memory means when said transfer data are written in said destination area; and
    (d) a display unit coupled to the central processing unit and having a display screen for displaying an image represented by the image data.

2. An image processing apparatus according to claim 1, wherein said mask means comprises:
    (a) register means written into with data which is representative of a predetermined number of transfer words within one line; and
    (b) selecting means for automatically selecting one of said first and second mask data stored in said first and second memory means or automatically inhibiting a mask process from being performed based on a difference between said predetermined number of transfer words and a number of transferred words.

3. An image processing apparatus according to claim 2, wherein said selecting means includes:
    (a) counter means for counting said number of transferred words;
    (b) zero detection means for detecting a count value of said counter means equals to zero so as to output a detection signal;
    (c) comparator means for comparing said predetermined number of transfer words with said number of transferred words and outputting a coincidence signal when such numbers coincide together; and
    (d) selector means for selecting said first mask data when said detection signal is supplied thereto and selecting said second mask data when said coincidence signal is supplied thereto.

4. An image processing apparatus according to claim 1, wherein said transfer data generating means includes:
    (a) first means for performing a rotation process on said source data to thereby shift bits of said source data such that bit positions of shifted source data correspond to those of destination area; and
    (b) second means for generating said transfer data by extracting predetermined continuing bits of one word from data of two bytes which are constituted by presently shifted source data and precedingly shifted source data.

5. An image processing apparatus which processes image data stored in a memory to thereby display an image on a display screen of a display unit under a control of a central processing unit comprising:
    (a) transfer data generating means for reading source data from data sources, including one word area, and an area of continuing two words provided within a source area so as to generate transfer data of one word having bits which are required for a certain word area within a destination area, said transfer data being obtained by shifting bits of said source data such that bit positions of shifted source data correspond to those of destination area and by extracting predetermined continuing bits of one word from said shifted source data;
    (b) logical operation means for performing a predetermined logical operation by using said transfer data, corresponding destination data of one word stored in said destination area and predetermined pattern data;
    (c) first and second memory means which are written into with first and second mask data, each of said first and second mask data permitting a data transfer to be performed on or inhibiting the data transfer from being performed on every bit of first and last words within one line of said destination area;
    (d) mask means for masking said first and last words within one line based on said first and second mask data stored in said first and second memory means when output data of said logical operation means are written in said destination area; and
    (e) a display unit coupled to the central processing unit and having a display screen for displaying an image represented by the image data.

6. An image processing apparatus according to claim 5, wherein said mask means comprises:
    (a) register means written by data representative of a predetermined number of transfer words within one line; and (b) selecting means for automatically selecting one of said first and second mask data stored in said first and second memory means or automatically inhibiting a mask process from being performed based on a difference between said predetermined number of transfer words and a number of transferred words.

7. An image processing apparatus according to claim 5, wherein said transfer data generating means includes:
   (a) first means for performing a rotation process on said source data to thereby shift bits of said source data such that bit positions of shifted source data correspond to those of destination area; and
   (b) second for generating said transfer data by extracting predetermined continuing bits of one word from data of two bytes which are constituted by presently shifted source data and precedingly shifted source data.

8. An image processing apparatus according to claim 5, wherein said logical operation means is set to perform plural kinds of logical operations each of which is selected by operation control data.

9. An image processing apparatus according to claim 6, wherein said selecting means includes:
   (a) counter means for counting said number of transferred words;
   (b) zero detection means for detecting a count value of said counter means equals to zero so as to output a detection signal;
   (c) comparator means for comparing said predetermined number of transfer words with said number of transferred words and outputting a coincidence signal when such numbers coincide together; and
   (d) selector means for selecting said first mask data when said detection signal is supplied thereto and selecting said second mask data when said coincidence signal is supplied thereto.

10. An image processing apparatus which processes image data stored in a memory to thereby display an image on a display screen of a display unit under a control of a central processing unit comprising:
    (a) register means for storing wait control data outputted from said central processing unit, said wait control data selecting one of a wait mode and a not-wait mode;
    (b) means for determining whether a wait signal is outputted therefrom to said central processing unit based on said wait control data stored in said register means when said central processing unit outputs a command for performing a reading operating on said memory, said central processing unit being subjected to a wait state when said wait signal is supplied thereto and being set in a non-wait state when it is not required to set said central processing unit in a wait state, said means outputting said wait signal to said central processing unit in said wait mode, said means normally not outputting said wait signal to said central processing unit in said not-wait mode, while said means outputs said wait signal in the case where a reading operation of said memory is not completed in said not-wait mode; and
    (c) a display unit coupled to the central processing unit and having a display screen for displaying an image represented by the image data.

11. An image processing apparatus according to claim 10 further comprising controller means which reads image data from said memory so as to convert said image data into color signals, said color signals with a synchronizing signal being supplied to said display unit wherein the image is displayed on the display screen, said controller means writing said wait control data in said register means, and said controller means outputting an end signal for designating a timing when said controller means completes the reading operation of said memory corresponding to said command outputted from said central processing unit.

* * * * *

UNITED STATES PATENT AND TRADEMARK OFFICE
CERTIFICATE OF CORRECTION

PATENT NO. : 4,992,960

DATED : February 12, 1991

INVENTOR(S) : Shigemitsu Yamaoka, et al.

It is certified that error appears in the above-identified patent and that said Letters Patent is hereby corrected as shown below:

Column 1, line 47: "transfer" should read as --transfer.--

Column 5, lines 48 & 49:
"$Q=k_7P\ S\ D+k_6P\ S\ D+k_5P\ S\ D+k_4P\ S\ D+k_3P\ S\ D+k_2P\ S\ D+k_1P\ S\ D+k_0P\ S\ D$  (1)" should read as $$-- Q = k_7P\ S\ D + k_6P\ S\ \bar{D} + k_5P\ \bar{S}\ D + k_4P\ \bar{S}\ \bar{D} + k_3\bar{P}\ S\ D + k_2\bar{P}\ S\ \bar{D} + k_1\bar{P}\ \bar{S}\ D + k_0\bar{P}\ \bar{S}\ \bar{D} \ \ldots \ \ldots (1)$$

Column 9, line 43: "ar" should read as --are--

Column 11, line 23: "and -bit" should read as --and 1-bit--

Column 19, line 14, Claim 7: "second for" should read as --second means for--

Signed and Sealed this

Third Day of November, 1992

Attest:

DOUGLAS B. COMER

Attesting Officer

Acting Commissioner of Patents and Trademarks